US012674716B2

(12) United States Patent
Champagnac et al.

(10) Patent No.: US 12,674,716 B2
(45) Date of Patent: Jul. 7, 2026

(54) METHOD FOR LEAK TESTING A SEALED AND THERMALLY INSULATING TANK FOR STORING A FLUID

(71) Applicant: GAZTRANSPORT ET TECHNIGAZ, Saint Remy les Chevreuse (FR)

(72) Inventors: Maxime Champagnac, Saint Remy les Chevreuse (FR); Pierre Jolivet, Saint Remy les Chevreuse (FR); Mael Bleomelen, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 560 days.

(21) Appl. No.: 18/029,418

(22) PCT Filed: Oct. 11, 2021

(86) PCT No.: PCT/EP2021/078035
§ 371 (c)(1),
(2) Date: Mar. 30, 2023

(87) PCT Pub. No.: WO2022/078950
PCT Pub. Date: Apr. 21, 2022

(65) Prior Publication Data
US 2023/0393012 A1 Dec. 7, 2023

(30) Foreign Application Priority Data

Oct. 15, 2020 (FR) ................................. FR2010578

(51) Int. Cl.
*G01M 3/00* (2006.01)
*F17C 13/00* (2006.01)
(52) U.S. Cl.
CPC .......... *G01M 3/002* (2013.01); *F17C 13/004* (2013.01); *F17C 2201/0157* (2013.01);
(Continued)

(58) Field of Classification Search
CPC .............................. G01M 3/002; F17C 13/004
See application file for complete search history.

(56) References Cited

U.S. PATENT DOCUMENTS 3,908,468 A * 9/1975 Katsuta ................. G01M 3/186
73/49.2
4,404,843 A * 9/1983 Johnson ................. G01M 3/226
73/40.7
(Continued)

FOREIGN PATENT DOCUMENTS

CN 103487214 A 1/2014
EP 0053546 A1 6/1982
(Continued)

OTHER PUBLICATIONS

Champagnac et al., Method for Checking the Leakproofiness of a Leakproof and Thermally Insulating Tank for Storing a Fluid, Jun. 2020, FIT Machine translation (Year: 2020).*
(Continued)

*Primary Examiner* — Erika J. Villaluna
(74) *Attorney, Agent, or Firm* — Notaro, Michalos & Zaccaria P.C.

(57) ABSTRACT

A method is described for checking the sealing of a sealed and thermally insulating tank for storing a liquefied gas at low temperature. The tank has a primary space and a secondary space where, in order to perform the check, a difference in pressure is created between the two spaces at least some of the inert gas injected into the primary space is recovered via at least one secondary outlet of the secondary space so as to be reinjected into the primary space.

16 Claims, 4 Drawing Sheets

(52) U.S. Cl.
CPC ................. *F17C 2203/0358* (2013.01); *F17C 2223/0153* (2013.01); *F17C 2250/0439* (2013.01)

(56) References Cited

U.S. PATENT DOCUMENTS

| | | |
|---|---|---|
| 2004/0003653 A1 | 1/2004 | Avila |
| 2015/0226629 A1 | 8/2015 | Murthy |

FOREIGN PATENT DOCUMENTS

| | | |
|---|---|---|
| JP | S61169733 A | 7/1986 |
| JP | H03177700 A | 8/1991 |
| JP | 4017307 B2 | 12/2007 |
| WO | 0240319 A2 | 5/2002 |
| WO | WO2014038192 A1 | 3/2014 |
| WO | 2020128370 A1 | 6/2020 |

OTHER PUBLICATIONS

International Search Report with English translation and Written Opinion for PCT/EP2021/078035 mailed Jan. 24, 2022.
International Application Status Report for PCT/EP2021/078035 generated Mar. 15, 2023.
Japanese Office Action for Patent Application No. 2023-522385, mailed Sep. 30, 2025.

* cited by examiner

[Fig.1]
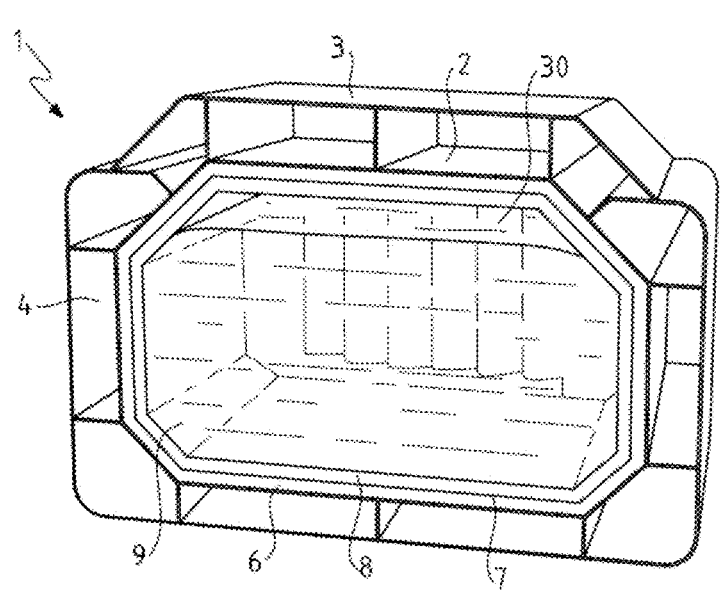
[Fig.2]
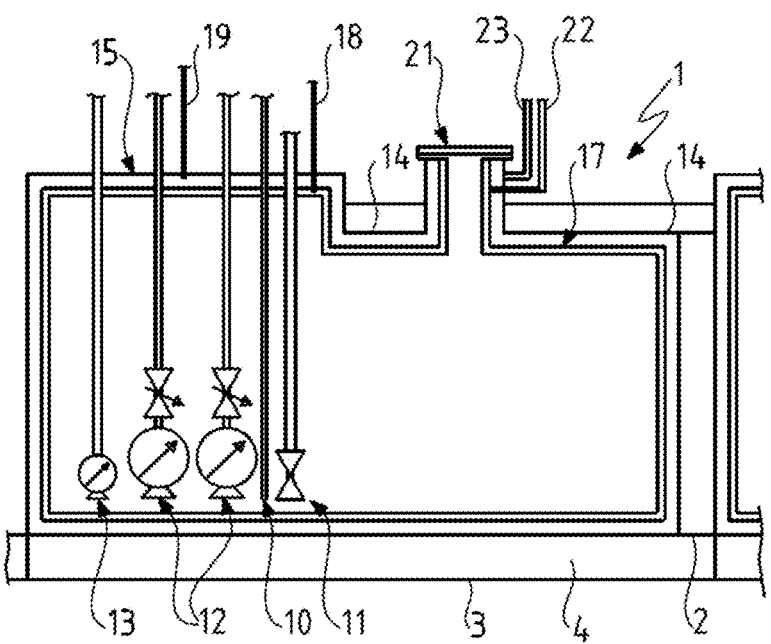

[Fig.3]
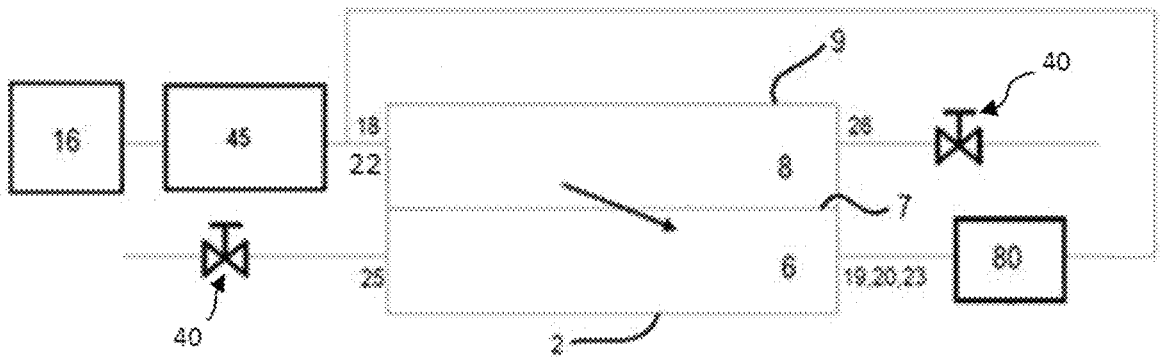
[Fig.4]
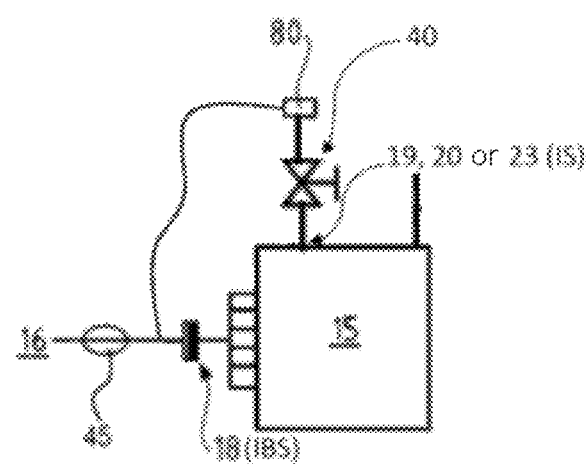
[Fig.5]
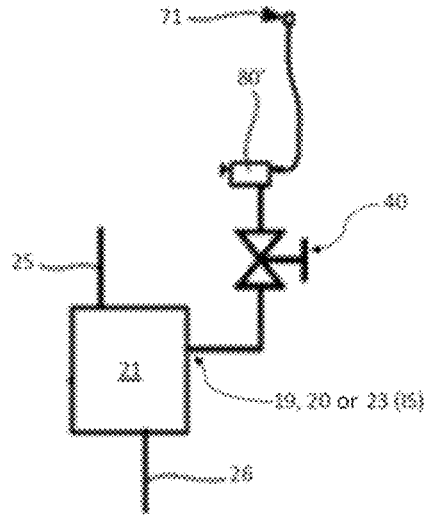

[Fig.6]
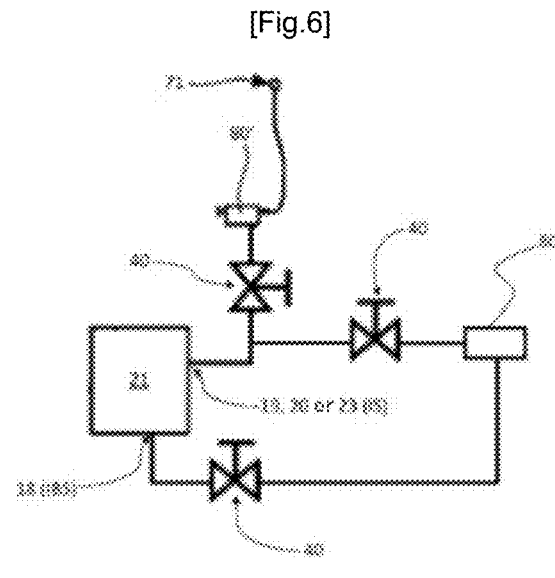
[Fig.7]
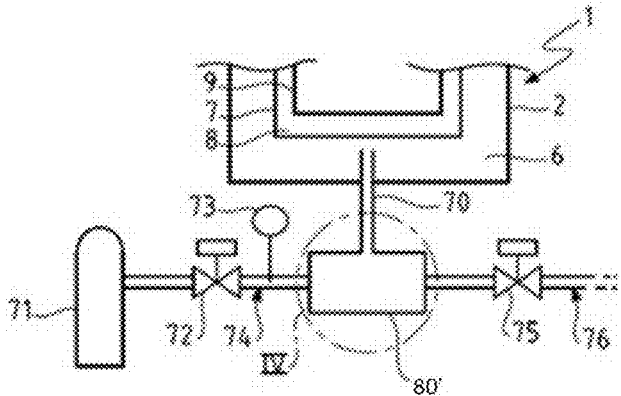
[Fig.8]
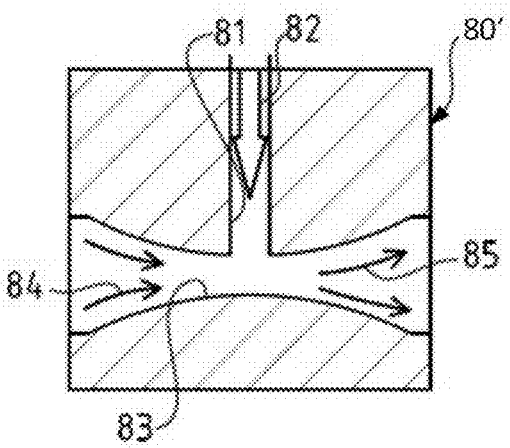

[Fig.9]

METHOD FOR LEAK TESTING A SEALED AND THERMALLY INSULATING TANK FOR STORING A FLUID

The invention relates to the field of sealed and thermally insulating tanks with membranes. In particular, the invention relates to the field of sealed and thermally insulating tanks for the storage and/or the transport of liquid at low temperature, such as tanks for transporting liquefied petroleum gas (also referred to as LPG) having, for example, a temperature between −50° C. and 0° C., or for transporting liquefied natural gas (LNG) at approximately −162° C. at atmospheric pressure. These tanks may be installed onshore or on a floating structure. In the case of a floating structure, the tank may be intended for the transport of liquefied gas at low temperature or to receive liquefied gas at low temperature which is used as fuel for propelling the floating structure. More specifically, the invention relates to devices and methods for detecting leakages in a secondary membrane of such a tank.

Tanks of vessels for transporting liquefied natural gas generally comprise a carrier structure which provides mechanical rigidity, a primary sealing membrane which is intended to be in contact with the product contained in the tank and a secondary sealing membrane which is arranged between the primary sealing membrane and the carrier structure. The secondary sealing membrane is intended to retain the product in the event of a leakage in the primary sealing membrane. The space between the primary sealing membrane and the secondary membrane is referred to as the primary space and the space between the secondary sealing membrane and the carrier structure is referred to as the secondary space.

The secondary sealing membrane is invisible and inaccessible after the tank has been produced. It is thus impossible to directly observe any faults of this membrane such as a scratch, a local dislocation of the membrane or an air channel between two components of which the membrane is composed.

In order to diagnose the sealing of the secondary membrane, a known reference is, in particular, document WO2020128370, filed in the name of the applicant, which describes a method for checking the sealing of this secondary membrane. In that method, the presence of leaks at the secondary sealing membrane is detected in particular by applying to the primary insulation space an inert pressure that is higher in comparison with that of the secondary insulating space.

The inert gas used in such a method is conventionally nitrous oxide. However, this gas is stored on board the ship in limited quantity and has numerous applications on the ship, whenever inert gas needs to be circulated.

Now, the applicant has found that, in instances in which leaks in the secondary sealing membrane are substantial, the amount of inert gas needed for the leak detection operation is very great, to the point of completely exhausting the ship's supply of inert gas during the operation of checking the sealing of the tank. This is because the inert gas, once it has been used for each checking operation, is released into the surrounding air.

At the present time, there is no method for testing the sealing of the secondary sealing membrane in which the quantity of inert gas used is reduced, or even in which the sealing is checked with a neutral balance sheet regarding the inert gas.

A notion on which the invention is based is to provide devices and methods for detecting leakages in a sealed and thermally insulating tank which is filled with liquid at low temperature which does not have these disadvantages. In this manner, an object of the invention is to be able to locate abnormal porosities of the secondary sealing membrane, even when the leakage rate is very high.

The present invention thus relates to a method for checking the sealing of a sealed and thermally insulating tank for storing a liquefied gas at low temperature, the tank being at a low temperature, the tank comprising a carrier structure which has an inner hull and an outer hull, a confined space between the inner hull and the outer hull, a primary sealing membrane which is intended to be in contact with the liquefied gas at low temperature contained in the tank, and a secondary sealing membrane which is arranged between the primary sealing membrane and the inner hull, a primary space between the primary sealing membrane and the secondary sealing membrane and a secondary space between the secondary sealing membrane and the inner hull, the primary space and the secondary space comprising insulating materials, the primary space comprising at least one primary gas inlet and the secondary space comprising at least one secondary gas outlet, said primary sealing membrane resting directly on the insulating materials contained in the primary space and said secondary sealing membrane resting directly on the insulating materials contained in the secondary space, the method comprising the following successive steps for detecting the location of a sealing defect of the secondary sealing membrane in the form of a cold spot on the outer surface of the inner hull:

a step referred to as the main step in which the secondary space is brought to a pressure lower than the pressure of the primary space, with a pressure differential P1, by injecting an inert gas into the primary space via the primary gas inlet and causing gas to be expelled or drawn from the secondary gas outlet of the secondary space and then by measuring the temperature of an outer surface of the inner hull from the confined space situated around the inner hull;

a step referred to as a subsequent step in which the temperature of the outer surface of the inner hull is measured from the confined space under the normal operating conditions of the tank.

The invention is characterized in that at least some of the inert gas injected into the primary space is recovered by at least one secondary outlet of the secondary space to be reinjected into the primary space.

Thus, the applicant is proposing a simple, effective and inexpensive system for performing a leak test on the secondary membrane of a tank for a liquefied gas, without the loss of inert gas or while losing a reduced quantity thereof, such that the checking method can always be performed, whatever the conditions of sealing of the secondary sealing membrane.

Specifically, after several trials, the applicant has sought out an architecture that is at once simple, robust and efficient, for recirculating the inert gas used during implementation of the method according to the invention.

The term "liquefied gas at low temperature" is intended to be understood to be any body which is in the vapor state under normal pressure and temperature conditions and which has been placed in the liquid state by lowering the temperature thereof.

The term "confined space" is intended to be understood to be the ballasts, the duct keels, the cofferdams, the passageways and the closure bridge of the tank, also referred to as the "trunk deck".

The expression "tank at low temperature" is intended to be understood to be a tank in which the liquefied gas at low temperature occupies at least 20% of the volume of the tank, preferably 70%, or a tank which does not contain a load of liquefied gas, or a volume less than 20% of the volume of the tank but then, in this instance, the tank is cooled by means of spraying, or projection, of a liquefied gas at low temperature, such as, for example, liquid nitrogen or LNG.

The expression "normal operating conditions of the tank" is intended to be understood to refer to the conditions under which the tank is normally used. In this state, the pressure of the primary space is conventionally slightly lower than that of the secondary space, for example, by a few mbar (millibar), i.e., from 2 to 7 mbar, or, in rarer cases, the pressure of the primary space may be greater than the pressure of the secondary space, for example, by from 0 to 4 mbar.

In what follows, the present invention is illustrated, without being restricted to this embodiment, using a ship for storing and transporting liquefied gas, of the LNGC (Liquefied gas Natural Gas Carrier) type which conventionally comprises four sealed and thermally insulated tanks for storing a liquefied gas.

Further advantageous features of the invention are set out succinctly below:

According to one embodiment, the entirety of the inert gas injected into the primary space is reinjected into said space after having been recovered by at least one suction means connected to a secondary outlet of the secondary space.

According to another embodiment, just some of the inert gas injected into the primary space, advantageously representing between 20% and 80% of the inert gas injected into the primary space, is reinjected into said space after having been recovered by at least one suction means connected to a secondary outlet of the secondary space.

Advantageously, the method according to the invention comprises a step referred to as the preliminary step in which the temperature of the outer surface of the inner hull is measured from the confined space under normal operating conditions of the tank.

Advantageously the pressure differential P1 is comprised:
between 500 Pa and 1500 Pa, preferably comprised between 800 Pa and 1200 Pa for a duration of at least 10 hours, preferably at least 12 hours, or
between 1800 Pa and 3200 Pa, preferably comprised between 2100 Pa and 2900 Pa Advantageously the step referred to as the main step is preceded by a step referred to as an intermediate step in which the secondary space is brought to a pressure lower than the pressure of the primary space, with a pressure differential of between 500 Pa and 1500 Pa, preferably between 800 Pa and 1200 Pa, by injecting an inert gas into the primary space via the primary gas inlet and causing gas to be expelled or drawn from the secondary gas outlet of the secondary space and then by measuring the temperature of an outer surface of the inner hull from the confined space situated around the inner hull.

As a preference, the inert gas consists of nitrous oxide.

Advantageously, the duration of each temperature measurement is at the most five hours, preferably a maximum of three hours. This duration is conventionally provided to prevent excessively significant cooling of the inner hull below the temperatures tolerated by the material of which the inner hull is composed.

As a preference, P1, advantageously the pressure differential in the step referred to as the intermediate step, is kept stable while the temperature is being measured. Thus, the pressures P1 and that of the step referred to as the intermediate step are ideally maintained at a value of within +/−5% of their respective defined pressure ranges.

The method according to the invention may further comprise a step of stabilizing the pressures in the primary space and the secondary space, a step of measuring the flow rate of the inert gas injected into the primary space, a step of measuring the flow rate of inert gas leaving the secondary space and a step of comparing the flow rate of inert gas injected into the primary space with the flow rate of inert gas leaving the secondary space in order to identify and quantify the flow rate of inert gas passing through the membrane and thus determining any potential porosity of the secondary membrane.

In a vessel, the tank, for example, on the upper wall thereof, has structures which are referred to as a vapor dome and a liquid dome. They may be in the form of two towers which are intended to allow the passage of cargo handling equipment for handling a liquid phase and a vapor phase of the liquefied gas at low temperature contained in the tank. As a result of this geometry, methods for detecting leakages based on the observation of abnormally hot or abnormally cold zones may fail, in particular as a result of the influence of the external climatic conditions and since the temperature ranges in and close to these towers may be very complex. By monitoring the flow rates of inert gas entering the primary space and leaving the secondary space by adding flow meters in the region of the primary gas inlet and the secondary gas outlet and a comparison of the values of these flow rates, it is thus possible to detect whether there is effectively a leakage in the tank.

According to an embodiment, the preceding steps can be carried out after the main steps. This enables any potential leakage of the gas dome and the liquid dome to be located when no leakage has been detected anywhere else by the temperature measurements.

According to an embodiment, the flow rate measurement steps are carried out at the same time as the main step, including the intermediate step if need be. This enables the total duration of the leakage detection method to be shortened and the consumption of inert gas to be reduced for the entire duration of the method.

According to an embodiment, the measurement of the flow rate of inert gas injected into the primary space is carried out at the primary gas inlet by means of a flow meter.

According to an embodiment, the measurement of the flow rate of inert gas leaving the secondary space is carried out at the secondary gas outlet by means of a flow meter.

According to an embodiment, only the primary gas inlet and the secondary gas outlet are open, the other gas inlets and the other gas outlets being closed.

According to an embodiment, the primary gas inlet is located on the liquid dome.

According to an embodiment, the secondary gas outlet is located on the gas dome.

This enables inerting lines which are also present in the domes to be used for these methods for detecting leakages in order to inert the primary and secondary spaces.

According to an embodiment, the inert gas is selected from helium, argon and the admixture thereof, with or without nitrous oxide being present in the mixture.

According to an embodiment, the liquefied gas at low temperature is selected from liquefied natural gas (LNG), liquefied petroleum gas (LPG), liquid ethane, liquid propane, liquid nitrogen, liquid dioxygen, liquid argon, liquid xenon, liquid neon and liquid hydrogen.

Such a method may be used in a floating structure, which is coastal or in deep water, in particular a liquid natural gas tanker, a floating storage and regasification unit (FSRU), a floating production, storage and offloading unit (FPSO) and the like. Such a storage installation may also act as a fuel reservoir in any type of vessel.

The present invention also relates to a floating or onshore storage installation for a liquefied gas at low temperature for implementing the method for checking the sealing of a sealed and thermally insulated tank as set out succinctly hereinabove, comprising:

a tank at low temperature comprising a carrier structure which has an inner hull and an outer hull, the space between the inner hull and the outer hull being referred to as the confined space, a primary sealing membrane which is intended to be in contact with the liquefied gas at low temperature contained in the tank, and a secondary sealing membrane which is arranged between the primary sealing membrane and the inner hull, the space between the primary sealing membrane and the secondary sealing membrane is referred to as the primary space and the space between the secondary sealing membrane and the inner hull is referred to as the secondary space, the primary space and the secondary space comprising insulating materials, the primary space comprising at least one primary gas inlet, the secondary space comprising at least one secondary gas outlet, said primary sealing membrane resting directly on the insulating materials contained in the primary space and said secondary sealing membrane resting directly on the insulating materials contained in the secondary space, an inert gas reservoir which is arranged in order to inject inert gas into the primary space through the primary gas inlet, an injection device which is capable of injecting inert gas of the inert gas reservoir via the primary gas inlet, and thus placing the primary space under pressure relative to the secondary space, a suction device which is connected to the secondary gas outlet in order to generate a pressure in the secondary space that is lower than the pressure in the primary space, a device for measuring the temperature of the outer surface of the inner hull, a system for displaying the temperature measurements in order to locate a sealing defect of the secondary sealing membrane in the form of a cold spot on the outer surface of the inner hull.

The invention is characterized in that the suction device comprises at least one suction means, consisting of a pump, drawing at least some of the inert gas from the secondary space to reinject it into the primary space, preferably using the aforesaid injection device.

According to one embodiment of the invention, the aforesaid suction means forms the only suction means of said device such that all of the inert gas recovered in the secondary space is reinjected into the primary space.

According to another embodiment of the invention, the suction device also comprises at least one suction system recovering the inert gas and not reinjecting it into the primary space.

Highly advantageously, the suction system is a Venturi effect suction system which comprises a main pipe which has an inlet which is capable of being connected to a pressurized gas source, and an outlet toward the outer side of the tank, a suction pipe having an upstream side which is capable of being connected to the outlet port of the secondary space and a downstream side which opens laterally into a convergent/divergent section of the main pipe so that a gas flow in the main pipe produces a reduced pressure in the suction pipe.

Of course, the suction system may equally consist of a conventional pump, or in other words a pump that is not a Venturi effect pump, operating from an electrical power supply. Provision may equally be made for the suction system to comprise one or more so-called conventional pumps and one or more Venturi effect pumps, these various pumps being able to be operated together or otherwise according to the choice of the operators performing the operations with regard to environmental conditions and/or other factors.

Advantageously, the pressurized gas source is a compressed air circuit. Such a source is conventionally present in a ship that carries hydrocarbons or, more generally, flammable or explosive substances.

As a preference, the injection device comprises a compressor which is capable of injecting the inert gas from the inert gas reservoir at a pressure between 3 and 8 bar.

According to an embodiment, the thickness of the primary sealing membrane is less than or equal to 2.5 mm (millimeter), for example, the thickness is less than or equal to 1.5 mm.

According to an embodiment, the thickness of the secondary sealing membrane is less than or equal to 1.5 mm (millimeter), for example, the thickness is less than or equal to 1.2 mm.

According to an embodiment, the suction device comprises a Venturi effect suction system which comprises a main pipe which has an inlet which is capable of being connected to a pressurized gas source and an outlet toward the outer side of the tank, a suction pipe having an upstream side which is capable of being connected to the outlet port of the secondary space and a downstream side which opens laterally in a convergent/divergent section of the main pipe so that a gas flow in the main pipe produces a reduced pressure in the suction pipe.

According to an embodiment, the suction device comprises a plurality of Venturi effect suction systems, these systems preferably being arranged in series in order to increase the suction capacity.

According to an embodiment, the Venturi effect suction systems are arranged in tiers.

According to an embodiment, the temperature measurement device is a photodetector.

According to an embodiment, the photodetector is a camera with an infra-red sensor.

According to an embodiment, the infra-red sensor is cooled using cryogeny techniques, in particular using the Peltier effect technology. Nevertheless, it is possible to envisage other techniques in which, for example, the sensor is enclosed in a chamber or enclosed in a Dewar flask, or cooled using a Stirling effect device. This reduction of the temperature of the sensor enables the thermal noise to be reduced.

According to an embodiment, the invention provides a vessel for transporting a liquefied gas at low temperature, comprising an above-mentioned floating storage installation.

According to an embodiment, the invention also provides a method for loading or unloading such a vessel, wherein a liquefied gas at low temperature is conveyed through insulated pipelines from or toward a floating or onshore storage installation toward or from the tank of the vessel.

According to an embodiment, the invention also provides a transfer system for a liquefied gas at low temperature, the system comprising the above-mentioned vessel, insulated pipelines arranged so as to connect the tank installed in the hull of the vessel to a floating or onshore storage installation and a pump for entraining a flow of liquefied gas at low temperature through the insulated pipelines from or toward the offshore or onshore storage installation toward or from the storage installation of the vessel.

The invention will be better understood and other objectives, details, features and advantages thereof will be appreciated more clearly from the following description of a number of specific embodiments of the invention, given purely by way of non-limiting example with reference to the appended drawings, in which:

FIG. 1 is a schematic cut-away illustration of a vessel tank.

FIG. 2 is a functional diagram of a vessel tank viewed in section along a longitudinal axis of the vessel.

FIG. 3 is a schematic diagram of the method of the invention.

FIG. 4 is a schematic illustration of a first embodiment of the nitrous oxide flow circuit according to the invention in a storage installation.

FIG. 5 is a schematic illustration of a second embodiment of the nitrous oxide flow circuit according to the invention in a storage installation.

FIG. 6 is a schematic illustration of a third embodiment of the nitrous oxide flow circuit according to the invention in a storage installation.

FIG. 7 is a schematic illustration of the arrangement of the Venturi effect suction system relative to the secondary space.

FIG. 8 is an enlarged sectional illustration of the zone IV of FIG. 7.

FIG. 9 is a schematic cut-away illustration of a storage installation for a liquefied gas at low temperature for a liquid natural gas tanker and a terminal for loading/unloading a tank of the storage installation for a liquefied gas at low temperature.

With reference to FIG. 1, a cross section of a tank 1 of a liquid natural gas tanker produced in accordance with the technology of membrane tanks has been illustrated schematically. A vessel may thus comprise one or more similar tanks. This tank is intended for the transport of liquefied gas at low temperature 30. A liquefied gas at low temperature is in the vapor state under normal pressure and temperature conditions and is placed in the liquid state by lowering the temperature thereof in particular for the transport thereof. This liquefied gas at low temperature could be liquefied natural gas, liquefied petroleum gas, liquid ethane, liquid propane, liquid nitrogen, liquid dioxygen, liquid argon, liquid xenon, liquid neon or liquid hydrogen.

The tank 1 comprises a carrier structure which provides the mechanical rigidity. The carrier structure is a dual wall which comprises an inner hull 2 and an outer hull 3. The inner hull 2 and the outer hull 3 delimit a confined space 4 whose dimensions are sufficient for humans to be able to move therein.

The confined space 4 combines the ballasts, the duct keels, the cofferdams, the passageways and the closure bridge of the tank 1, also referred to as the "trunk deck".

The tank 1 further comprises a primary sealing membrane 9 which is intended to be in contact with the product contained in the tank, and a secondary sealing membrane 7 which is arranged between the primary sealing membrane 9 and the inner hull 2. The secondary sealing membrane 7 is intended to retain the product in the event of a leakage in the primary sealing membrane 9. The space between the primary sealing membrane 9 and the secondary sealing membrane 7 is referred to as the primary space 8 and the space between the secondary sealing membrane 7 and the inner hull 2 is referred to as the secondary space 6.

The primary space 8 and the secondary space 6 comprise insulating materials which are in the form of juxtaposed panels of thermally insulating material. These panels may be of expanded or cellular synthetic resin or another natural or synthetic thermally insulating material. Furthermore, these spaces 6, 8 comprise a filling material such as glass wool or mineral wool. This filling material may be intended to be inserted between the juxtaposed panels.

The primary sealing membrane 9 rests directly on the insulating materials of the primary space 8, and the secondary sealing membrane 7 rests directly on the insulating materials of the secondary space 6.

With reference to FIGS. 2 and 3, the tank comprises an upper wall 14 which is interrupted at two locations by two protruding structures in the form of a tower or chimney. They are intended to allow the passage of cargo handling equipment for handling a liquid phase and a vapor phase of the liquefied gas at low temperature with a view to its storage in the tank. The first tower is a liquid dome 15 which acts as an introduction location for various items of handling equipment, that is to say, in the example illustrated a filling line 10, an emergency pumping line 11, unloading lines which are connected to unloading pumps 12, a spraying line (not illustrated) and a supply line which is connected to a spraying pump 13. The second tower is a vapor dome 21 which acts as an introduction location for a vapor collection pipe. The operation of this equipment is further known.

The primary space 8 comprises a primary gas inlet 18 and a primary gas outlet 26. It may further comprise a second primary gas inlet 22. The secondary space 6 comprises a secondary gas inlet 25 and a secondary gas outlet 19. The secondary space 6 may further comprise a second secondary gas outlet 20 and a third secondary gas outlet 23.

The tank may further comprise a safety valve [24] in the event of excess pressure in the primary space 8 and secondary space 6.

The secondary sealing membrane 7 is invisible and inaccessible after the tank has been produced. The method for checking the sealing of a tank according to the invention enables defects of the secondary sealing membrane 7 to be detected and located and is suitable for the majority of tank technologies.

With reference to FIG. 1 or 3, the method is based on the use of a thermal gradient which is generated between the primary space 8 and secondary space 6 of a tank 1 loaded with liquefied gas at low temperature 30 in order to detect by means of thermal imaging or thermography the impact on the inner hull 2 of an inert gas passing through the secondary sealing membrane 7. The tank is loaded at least to 20% of the total capacity thereof with liquefied gas at low temperature or is cooled by spraying a cryogenic liquid.

This FIG. 3 illustrates one of the principal aspects of the checking method according to the invention, namely the reinjection of at least some of the inert gas introduced into the primary space 8 thanks to a suction means 80, in this instance a conventional pump, which at a secondary outlet 19, 20 or 23 of the secondary space 6 recovers some or all of this injected inert gas to convey it, via a pipe, so that it circulates once again into the primary space 8, via one of the primary inlets 18 or 22. In FIGS. 3 to 6, valves 40 are arranged on the pipes in order to regulate the flowrate or haft the flow in the pipe concerned.

FIGS. 4 to 6 show arrangements for achieving this recirculation of the inert gas, it being appreciated that these embodiments are nonlimiting examples which may, moreover, be combined.

Thus, in FIG. 4, an injection device 45 is installed at the primary gas inlet 18 and attached to the inert gas reservoir 16. The inert gas is, for example, nitrous oxide. This injection device 45 will enable inert gas to be injected into the primary space 8. A suction device 80 is also installed in the region of the secondary gas outlet 19.

This suction means 80 has two main functions, firstly to enable the generation of a pressure difference between the primary space 8 and the secondary space 6 to be made easier, even if the porosity of the secondary sealing membrane 7 is very significant, and to recirculate all or some of the nitrous oxide injected into the primary space 8. Of course, the inert gas recovered by the suction means 80 must not be mixed with any other gas or constituent. In order to ensure that this recirculated inert gas does not include any ancillary or unwanted gas, provision may be made for particle filters to be inserted into the recirculation circuit.

FIGS. 5 and 6 show a suction system 80' which has the sole function of drawing the inert gas from the secondary space 6, but does not have the ability or the function of reinjecting this inert gas into the primary space 8. Thus, to the architecture depicted in FIG. 4, which may in itself suffice, may be added the module having the architecture depicted in FIG. 5 in which the suction system 80' draws the inert gas from the gas dome 21, via a secondary outlet 19, 20 or 23.

More specifically, in the architecture of FIG. 4, the inert gas is injected into the primary space 8 at the liquid dome 15 and the recovery of the inert gas is likewise performed at the liquid dome 15, via a secondary outlet 19, 20 or 23. A valve 40 enables regulation of the flow drawn in by the suction means 80. The suction means 80 is connected to the circuit conveying the inert gas, from the reservoir 16, downstream (as depicted in this FIG. 4) or upstream of the injection device 45, preferably upstream of said device 45 so as to use the suction power of the latter 45.

FIG. 6 depicts an architecture in which use is made of a suction means 80 that causes the inert gas to be recirculated into the primary space 8 via, for example, the primary inlet 18, and a suction system 80' which discharges the recovered inert gas into the surrounding air in the conventional way. Of course, the architecture of FIG. 6 needs to be combined for example with an injection device 45 in order to initiate the injection of inert gas into the primary space 8.

By way of nonlimiting example, for such architecture employing a suction means 80 and a suction system 80', it is possible to have an injection device 45 injected at 100 m$^3$/hour (cubic metres per hour), pumps 80 and 80' each having a flow rate of 50 m$^3$/hour. In that case, since the flow rate injected by the pump 80 is 50 m$^3$/hour, the capacity of the injection device can be regulated or lowered to 50 m$^3$/hour in order to achieve a constant injection rate 45. Of course, this ratio of 50% recirculation or reinjection of inert gas can be chosen to have a different value, through the selection of pump(s) 80 of a higher or lower power and/or through flow regulation using the circuit valves 40.

In instances in which the suction means 80 alone performs the suction, and therefore the reinjection of inert gas into the primary space 8, the injection device 45 can be shut off or stopped after a few moments so that the suction means 80 alone is circulating the inert gas, constantly recirculating this gas for the time it takes to conduct the checking operations. Of course, in such a solution, the suction means 80 needs to consist of a pump, or a series of pumps, powerful enough to be able, alone, to handle the functions of injecting inert gas and recirculating same.

The suction device 80' may, for example, be a system of the Venturi type. It will thus be connected to the compressed air system 71 of the boat. With reference to FIGS. 7 and 8, the operation of the Venturi system will be described. When the valves 72 and 75 are open, a flow of compressed air is introduced into the inlet side of the convergent/divergent section, as indicated by the arrows 84, and brings about as a result of the Venturi effect a reduced pressure in the lateral pipeline 81 of the Venturi effect suction system 80' which is connected to the sampling pipeline 70 which is connected to the secondary gas outlet 19 of the secondary space 6. A quantity of inert gas contained in the secondary space 6 is subsequently drawn in, as indicated by the arrow 82. The flow of inert gas drawn in and the flow of compressed air mix in the outlet side of the convergent/divergent section, as indicated by the arrows 85, and flow into the pipeline 76 which opens at the outer side of the tank.

Preferably, a valve 40 is also provided in the sampling pipeline 70 which is opened only after a stable flow of compressed air has been established at an appropriate speed in the main pipe 83. This enables a reflux of air in the direction of the secondary space 6 to be prevented during the starting phase of the flow of compressed air. It is possible in the same manner to completely or partially close this valve before interrupting the flow of compressed air or to control the flow rate/suction flow.

Before carrying out the main steps, namely the creation of the pressure differential P1 (step referred to as main step) and the step referred to as the intermediate step, it is possible to reduce the heating of the confined space 4 at least 3 hours before the detection by means of thermography. This is because heating could conceal a potential cold spot on the inner hull 2.

Then, it is ensured that the gas pressure in the tank 1, if it is filled with a liquefied gas at low temperature, is greater than 50 mbarg. Then, the value of the pressure in the secondary space 6 is reduced in order to reach a value between 1 mbarg and 5 mbarg without using the suction device and leaving in an open position only the secondary gas outlet 19, all the other gas inlets and gas outlets of the secondary space 6 being closed. The secondary gas outlet 19 is preferably located on the liquid dome 15. However, it is possible to accelerate the process by connecting the suction device 80, 80' to a second secondary gas outlet 20 of the secondary space which is placed in an open position. The second secondary gas outlet 20 is preferably located on the liquid dome 15. Should this not be sufficient, the suction device 80, 80' could be connected to a third secondary gas outlet 23 of the secondary space which is then also placed in an open position. The third secondary gas outlet 23 is preferably located on the liquid dome 15. Where applicable, it is possible to use a suction device 80 for each gas outlet of the secondary space.

Then, or in parallel with the step described above, the injection device 45 is activated in order to inject nitrous oxide from the gas source 71 into the primary space 8 via the primary gas inlet 18 so that the value of the pressure in the primary space 8 reaches a value between 21 and 29 mbar above the pressure of the secondary space 6. Only the primary gas inlet 18 is left in the open position, all the other gas inlets and outlets of the primary space 8 being closed. If this is not sufficient, the injection device 45 may also be connected to a second primary gas inlet 22 of the primary space 8. This second primary gas inlet 22 may be located in the region of the gas dome. Where applicable, stabilization of the pressure is then awaited. This may take between 30 and 60 minutes.

The pressures of the primary and secondary spaces are controlled within acceptable pressure ranges by safety valves (not illustrated) of the primary and secondary spaces.

It is then possible to carry out the measurement of the temperatures on the outer surface of the inner hull 2 by means of thermography from the confined space 4.

After the measurement has been carried out, the pressures of the spaces are returned to their values for normal operating conditions and the heating of the confined space 4.

Using this method, the inert gas is cooled by passing into the primary space 8. Then, the cooled inert gas passes through the secondary sealing membrane 7 if it has abnormal porosities. The cooled inert gas will then generate a cold spot on the inner hull 2. A thermal camera is then used to detect the potential cold spot on the outer surface of the inner hull 2.

In order to measure the temperature of the outer surface of the inner hull 2 from the confined space 4, a photodetector can be used such as a thermographic camera with an infrared sensor as a result of the extent for which it is necessary to measure the temperature. It records different infrared radiations which are transmitted by the surface observed and which vary as a function of their temperature. This type of camera uses a container which is cooled by cryogenic techniques, the sensor being able to be enclosed in a vacuum chamber. This reduction or this control of the temperature of the sensor may be found to be advantageous for reducing the thermal noise to a level less than that of the signal of the scene filmed.

Typically, it is possible to use a thermographic camera with an infrared sensor which is capable of detecting wavelengths between 7.5 and 13 μm, with a sensitivity of less than 0.05 K on a black body at 303K±10K and a precision of less than 2K on a black body in the range from 253K to 353K.

The image obtained with the type of cameras explained above is referred to as a thermogram and consists of an image in which at each point of the image there is allocated a temperature value observed by the thermographic camera with an infrared sensor. In order to facilitate the visual detection of the temperatures and therefore to facilitate the location of a cold spot on the inner hull 2, a color representing a temperature may be associated with the points of the thermogram.

However, it is possible to obtain cold spots which are not caused by a sealing defect. They may be the result of other phenomena which take place in the secondary space, such as conduction, natural convection, forced convection or radiation. In order to eliminate them and to refine the detection of leakages in the secondary sealing membrane 7, the data obtained using the thermographic camera may be postprocessed. In this manner, the temperature gradient illustrated by the cold spot must comply with the following two conditions:

$$|\Delta T_{ult\acute{e}rieur}| < |\Delta T_{interm\acute{e}diaire}| <$$

$$|\Delta T_{principal}| \text{ and } |\Delta T_{principal}| - |\Delta T_{ult\acute{e}rieur}| \geq 1K$$

The terms "ultérieur" "intermédiaire" and "principale" connected with the temperature refer to temperature measurements following the steps referred to as the subsequent, intermediate and main steps, respectively.

$\Delta T_{ult\acute{e}rieur}$ indicates the temperature difference between the temperature of a point of the image measured in the subsequent step and the mean temperature of a reference zone of the inner hull measured in the subsequent step, $\Delta T_{interm\acute{e}diaire}$ indicates the temperature difference between the temperature of the preceding point of the image measured in the intermediate step and the mean temperature of a reference zone of the inner hull measured in the intermediate step, $\Delta T_{principal}$ indicates the temperature difference between the temperature of the preceding point of the image measured in the main temperature measurement step and the mean temperature of a reference zone of the inner hull measured in the main step.

In its entire procedure, the checking method according to the invention comprises four successive steps, namely:

1. a preliminary step with a temperature measurement under the normal operating conditions of the tank 1, then 2. an intermediate step with a temperature measurement in which the pressure differential between the primary space 8 and the secondary space 6—in favor of the primary space 8—is comprised between 500 Pa and 1500 Pa, preferably between 800 Pa and 1200 Pa, then 3. a main step with a temperature measurement in which the pressure differential between the primary space 8 and the secondary space 6 is equal to P1, then 4. a subsequent step with a temperature measurement under the normal operating conditions of the tank 1.

It is important to note that only steps 3 and 4 are essential, or in other words that the control method according to the invention needs to perform at least these two steps in succession.

The method for checking the sealing of a tank may thus comprise a preliminary step whose objective is to ensure that there is no cold spot on the inner hull under normal operating conditions of the tank. It may also enable the emissivity of the painting of the inner hull to be verified locally in order to determine the performance levels of the temperature measurement.

First of all, the heating of the confined space is reduced or stopped at least 3 hours before the inspection. The pressures of the primary space 8 and secondary space 6 are maintained in accordance with the normal operating conditions of the tank, for example, the pressure of the secondary space 6 is greater than the pressure of the primary space 8. Then, the inner hull 2 is completed inspected using a thermal camera. This enables the inner hull 2 to be thermally inspected under normal operating conditions of the tank. At the end of the inspection, the system of the confined space 4 is returned to normal operating conditions.

In order to ensure in particular that the tank 1 has not been damaged or the state thereof worsened by the main steps, a subsequent step for measuring the temperature of the outer surface of the inner hull 2 is carried out. This subsequent step is identical in all regards to the preliminary step with respect to the conditions of implementation. If the preliminary step has been carried out, it will then be possible to compare the thermograms obtained in order to draw a conclusion regarding the state of the tank under normal operating conditions. If the preliminary step has not been carried out, it will then be possible to ensure that there is no cold spot on the thermogram.

Finally, the method may also include an intermediate step in order to determine whether the tank is capable of withstanding the main steps. In this manner, the intermediate step can be carried out before the main steps and after the preliminary step. This step involves measuring the temperature of the outer surface of the inner hull 2 from the confined space 4 when the pressure difference between the primary space 8 and the secondary space 6 is between 800 Pa and 1200 Pa, the primary space 8 being under excess pressure by the pressure difference compared with the secondary space 6.

Before carrying out this intermediate step, it is possible to reduce the heating of the confined space 4 at least 3 hours before the detection by means of thermography. This is because, in this instance also the heating could mask any potential cold spot on the inner hull 2. Then, it is ensured that the gas pressure in the tank 1, if it is filled with a liquefied gas at low temperature, is greater than 50 mbarg. Then, the value of the pressure in the secondary space 6 is reduced in order to achieve a value between 1 mbarg and 5 mbarg using the suction device and leaving only the secondary gas outlet 19 in an open position. Afterwards, the injection device 45 is activated in order to inject nitrous oxide from the gas source 71 into the primary space 8 through the primary gas inlet 18 so that the pressure value in the primary space 18 reaches a value between 8 and 12 mbar above the pressure of the secondary space 6. Only the primary gas inlet 18 is left in the open position, all the other gas inlets and gas outlets of the primary space 8 being closed. Where applicable, the stabilization of the pressure is then awaited. This can take between 30 and 60 minutes. The pressures of the primary and secondary spaces are controlled in the pressure ranges acceptable by the safety valves (not illustrated) of the primary and secondary spaces. It is then possible to carry out the thermal inspection of the outer surface of the inner hull 2 by means of thermography from the confined space 4. After the measurement has been carried out, the pressures of the spaces are returned to their values for normal operating conditions and the heating of the confined space 4.

In this manner, if the thermographic inspection carried out following this intermediate step does not have significant cold spots, the tank will be able to withstand the main steps of the method.

As a result of the geometry of the liquid dome 15 and the gas dome 21, the method described above may possibly fail. This is because the external climatic conditions and the temperature ranges in and in the vicinity of these towers may distort the temperature measurements with the thermographic camera and/or be very complex to take into account in the post-processing of the temperature measurements. The method may thus be supplemented with a measurement of the flow of nitrogen passing through the potential leakages of the secondary sealing membrane 7. Preferably, the flow will be orientated from the primary space to the secondary space.

A first flow meter is installed in the liquid dome 15. The flow meter is installed on the pipeline which connects the nitrogen source 16 and the primary gas inlet 18. The other primary inlets are placed in a closed position. The primary outlets are themselves also in a closed position. In this manner, the only possible path of the nitrogen flow is to pass toward the secondary space if the secondary sealing membrane 7 has an abnormal porosity. This flow meter will therefore enable the flow of nitrogen entering the primary space to be measured.

A second flow meter is installed, it is placed at the level of the secondary gas outlet 19 of the secondary space 6 located on the gas dome 21. The secondary inlets and the other secondary outlets are in a closed position. In this manner, the flow meter correctly measures the flow of nitrogen passing from the primary space 8 to the secondary space 6 via an abnormal porosity of the secondary sealing membrane 7.

With this arrangement, it is ensured that the flow of nitrogen passes via the flow meters and losses of information are prevented. It should be noted that the location of the flow meters may be different on each vessel.

Before the installation of the flow meters, it is ensured that the pressures in the primary and secondary spaces are normal, that is to say, the pressures observed under normal operating conditions. The vapor pressure in the tank, if it is filled with liquefied gas at low temperature, has to be maintained above 50 mbarg, preferably above 100 mbarg. The primary and secondary inlets and the primary and secondary outlets which can influence the measurement of the flow of nitrogen are then placed in a closed position. Then, the flow meters are installed, the first flow meter is placed at the primary gas inlet 18 and the second flow meter is placed at the secondary gas outlet 19 or at the second secondary gas outlet 20. After the flow meters have been assembled, the primary space 8 is supplied with nitrogen whilst controlling this supply using a valve, for example, up to 12 m³/h (cubic meters per hour). The measurement of the flow rates entering the primary space and leaving the secondary space using the flow meters is then begun. The control and the measurement of the flow rates at the primary gas inlet 18 and the secondary gas outlet 19 lasts a maximum of 5 hours, preferably 3 hours.

At the end of the measurements, the flow rates at the primary gas inlet 18 and the secondary gas outlet 19 are compared. If the measurements are similar, the secondary sealing membrane 7 has an abnormal porosity, in particular in the region of the liquid dome and/or gas dome. If the flow rates are significantly different or the flow rate at the secondary gas outlet is zero, however, the secondary sealing membrane 7 does not have abnormal porosity anywhere.

The installation which is described above and uses the method described above may be used, for example, in an onshore installation or in a floating structure such as a liquid natural gas tanker or the like.

Figure 9:
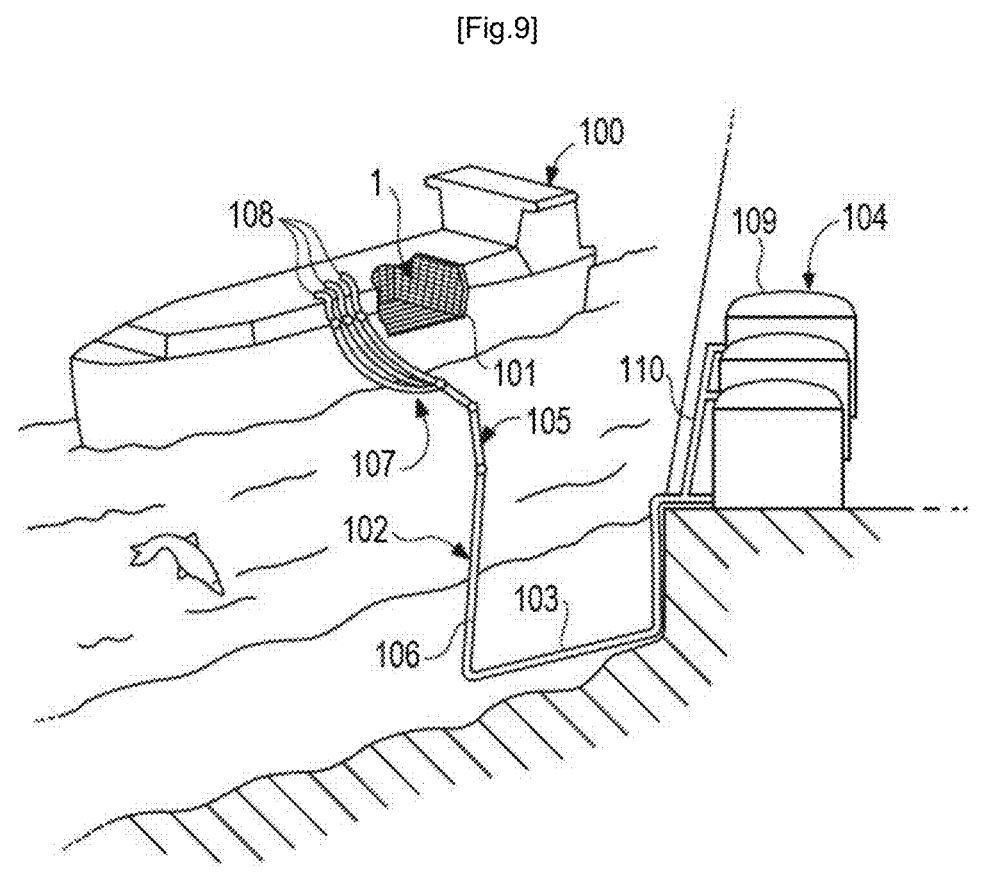

With reference to FIG. 9, a cut-away view of a liquid natural gas tanker 100 shows an installation for storing a liquefied gas at low temperature comprising a sealed and insulated tank 1 of generally prismatic shape mounted in the dual hull 101 of the vessel. The tank 1 comprises a primary sealing membrane which is intended to be in contact with the liquefied gas at low temperature LNG contained in the tank such as LNG, a secondary sealing membrane which is arranged between the primary sealing membrane and the dual hull 101 of the vessel, and two insulating barriers which are arranged between the primary sealing membrane and the secondary sealing membrane and between the secondary sealing membrane and the dual hull 101, respectively.

FIG. 9 shows an example of a sea terminal comprising a loading and unloading station 103, an underwater pipe 104 and an onshore installation 105. The loading and unloading station 103 is a fixed offshore installation which comprises a movable arm 106 and a tower 107 which supports the movable arm 106. The movable arm 106 carries a bundle of insulated flexible pipes 108 which can be connected to the loading/unloading channels 109. The movable arm 106 which can be orientated adapts to all gauges of liquid natural gas tankers. A connection pipe which is not illustrated extends inside the tower 107. The loading and unloading station 103 enables the vessel 100 to be loaded and unloaded to or from the ground-based installation 105. This comprises storage tanks for liquefied gas at low temperature 110 and connection pipes 111 which are connected via the underwater pipe 104 to the loading and unloading station 103. The underwater pipe 104 enables the liquefied gas at low temperature to be transferred between the loading and unloading station 103 and the ground-based installation 105 over a great distance, for example, 5 km, which enables the vessel 100 to be kept at a great distance from the coast during the loading and unloading operations.

In order to bring about the pressure required for the transfer of the liquefied gas at low temperature, pumps on board the vessel 100 and/or pumps with which the ground-based installation 105 is provided and/or pumps with which the loading and unloading station 103 is provided are used.

Although the invention has been described in connection with several specific embodiments, it is self-evident that it is by no means limited thereto and that it comprises all the technical equivalents of the means described and the combinations thereof if they are included within the scope of the invention.

The use of the verb "have", "comprise" or "include" and the conjugated forms thereof does not exclude the presence of elements or steps other than those set out in a claim.

In the claims, any reference numeral in brackets should not be interpreted to be a limitation of the claim.

The invention claimed is:

1. A method for checking the sealing of a sealed and thermally insulating tank (1) for storing a liquefied gas at low temperature (30), the tank (1) being at low temperature (30), the tank (1) comprising a carrier structure which has an inner hull (2) and an outer hull (3), a confined space (4) between the inner hull (2) and the outer hull (3), a primary sealing membrane (9) which is intended to be in contact with the liquefied gas at low temperature (30) contained in the tank (1), and a secondary sealing membrane (7) which is arranged between the primary sealing membrane (9) and the inner hull (2), a primary space (8) between the primary sealing membrane (9) and the secondary sealing membrane (7) and a secondary space (6) between the secondary sealing membrane (7) and the inner hull (2), the primary space (8) and the secondary space (6) comprising insulating materials, the primary space (8) comprising at least one primary gas inlet (18) and the secondary space (6) comprising at least one secondary gas outlet (19), said primary sealing membrane resting directly on the insulating materials contained in the primary space and said secondary sealing membrane resting directly on the insulating materials contained in the secondary space, the method comprising the following successive steps for detecting the location of a sealing defect of the secondary sealing membrane (7) in the form of a cold spot on the outer surface of the inner hull (2):

a step referred to as main step in which the secondary space (6) is brought to a pressure lower than the pressure of the primary space (8), with a pressure differential P1, by injecting an inert gas into the primary space via the primary gas inlet (18) and causing gas to be expelled or drawn from the secondary gas outlet (19) of the secondary space and then by measuring the temperature of an outer surface of the inner hull (2) from the confined space (4) situated around the inner hull (2);

a step referred to as a subsequent step in which the temperature of the outer surface of the inner hull (2) is measured from the confined space (4) under the normal operating conditions of the tank (1);

characterized in that, during the main step, at least some of the inert gas injected into the primary space (8) is recovered by at least one secondary outlet (19, 20 or 23) of the secondary space (6) and is reinjected into the primary space (8).

2. The method as claimed in claim 1, wherein the entirety of the inert gas injected into the primary space (8) is reinjected into said space (8) after having been recovered by at least one suction means (80) connected to a secondary outlet (19, 20 or 23) of the secondary space (6).

3. The method as claimed in claim 1, wherein just some of the inert gas injected into the primary space (8), advantageously representing between 20% and 80% of the inert gas injected into the primary space (80), is reinjected into said space (8) after having been recovered by at least one suction means (80) connected to a secondary outlet of the secondary space (6).

4. The method as claimed in claim 1, wherein said method comprises a step referred to as preliminary step in which the temperature of the outer surface of the inner hull (2) is measured from the confined space (4) under the normal operating conditions of the tank (1).

5. The method as claimed in claim 1, wherein the pressure differential P1 is:

comprised between 500 Pa and 1500 Pa for a duration of at least 10 hours, or comprised between 1800 Pa and 3200 Pa.

6. The method as claimed in claim 1, wherein the step referred to as the main step is preceded by a step referred to as an intermediate step in which the secondary space (6) is brought to a pressure lower than the pressure of the primary space (8), with a pressure differential of between 500 Pa and 1500 Pa by injecting an inert gas into the primary space via the primary gas inlet (18) and causing gas to be expelled or drawn from the secondary gas outlet (19) of the secondary space and then by measuring the temperature of an outer surface of the inner hull (2) from the confined space (4) situated around the inner hull (2).

7. The method as claimed in claim 1, wherein the inert gas consists of nitrous oxide.

8. The method as claimed in claim 1, wherein the duration of each temperature measurement is at the most five hours.

9. The method as claimed in claim 1, wherein P1, advantageously the pressure differential of the step referred to as the intermediate step, is kept stable while the temperature is being measured.

10. A floating or onshore storage installation for a liquefied gas at low temperature (30), comprising:

a tank (1) at low temperature (30) comprising a carrier structure which has an inner hull (2) and an outer hull (3), the space between the inner hull (2) and the outer hull (3) being referred to as the confined space (4), a primary sealing membrane (9) which is intended to be in contact with the liquefied gas at low temperature (30) contained in the tank, and a secondary sealing membrane (7) which is arranged between the primary sealing membrane (9) and the inner hull (2), the space between the primary sealing membrane (9) and the secondary sealing membrane (7) is referred to as the primary space (8) and the space between the secondary sealing membrane (7) and the inner hull (2) is referred to as the secondary space (6), the primary space (8) and the secondary space (6) comprising insulating materials, the primary space (8) comprising at least one primary gas inlet (18), the secondary space (6) comprising at least one secondary gas outlet (19), said primary sealing membrane resting directly on the insulating materials contained in the primary space and said secondary sealing membrane resting directly on the insulating materials contained in the secondary space, an inert gas reservoir (16) which is arranged in order to inject inert gas into the primary space (8) through the primary gas inlet, an injection device (45) which is capable of injecting inert gas of the inert gas reservoir (16) via the primary gas inlet (18), and thus placing the primary space (8) under pressure relative to the secondary space (6), a suction device (80, 80') which is connected to the secondary gas outlet (19) in order to generate a lower pressure in the secondary space (6) than the pressure in the primary space (8), a device for measuring the temperature of the outer surface of the inner hull (2), a system for displaying the temperature measurements in order to locate a sealing defect of the secondary sealing membrane (7) in the form of a cold spot on the outer surface of the inner hull (2), characterized in that the suction device comprises at least one suction means (80) consisting of a pump that draws at least some of the inert gas out of the secondary space (6) and reinjects it into the primary space (8) via the aforesaid injection device (45).

11. The installation as claimed in claim 10, wherein the aforesaid suction means (80) forms the only suction means (80) of said device such that all of the inert gas recovered in the secondary space (6) is reinjected into the primary space (8).

12. The installation as claimed in claim 10, wherein the suction device also comprises at least one suction system (80') recovering the inert gas and not reinjecting it into the primary space (8).

13. The installation as claimed in claim 12, wherein the suction system (80') is a Venturi effect suction system (80') which comprises a main pipe (83) which has an inlet which is capable of being connected to a pressurized gas source (71), and an outlet toward the outer side of the tank (1), a suction pipe (81) having an upstream side which is capable of being connected to the outlet port of the secondary space (6) and a downstream side which opens laterally in a convergent/divergent section of the main pipe (83) so that a gas flow in the main pipe (83) produces a reduced pressure in the suction pipe (81).

14. The installation as claimed in claim 13, wherein the pressurized gas source (71) is a compressed air circuit.

15. The installation as claimed in claim 10, wherein the injection device (45) comprises a compressor which is capable of injecting the inert gas from the inert gas reservoir (16) at a pressure between 3 and 8 bar.

16. A vessel (100) for transporting a liquefied gas at low temperature (30), the vessel comprising an installation for storing a liquefied gas at low temperature (30) as claimed in claim 10.

* * * * *